(12) United States Patent
Dupuy et al.

(10) Patent No.: US 11,618,249 B2
(45) Date of Patent: Apr. 4, 2023

(54) DUAL PHOTOINITIATED NANOCOMPOSITE-INK PRINTING

(71) Applicant: Vadient Optics, LLC., Beaverton, OR (US)

(72) Inventors: Charles G. Dupuy, Corvallis, OR (US); Bradley J Hermens, Corvallis, OR (US)

(73) Assignee: VADIENT OPTICS, LLC, Beaverton, OR (US)

( * ) Notice: Subject to any disclaimer, the term of this patent is extended or adjusted under 35 U.S.C. 154(b) by 403 days.

(21) Appl. No.: 15/099,403

(22) Filed: Apr. 14, 2016

(65) Prior Publication Data

US 2017/0297953 A1 Oct. 19, 2017

(51) Int. Cl.
*B41J 2/01* (2006.01)
*C09D 11/101* (2014.01)
(Continued)

(52) U.S. Cl.
CPC ............... *B41J 2/01* (2013.01); *C09D 11/101* (2013.01); *C09D 11/322* (2013.01); *C09D 11/38* (2013.01); *C09D 11/40* (2013.01); *C09D 11/50* (2013.01)

(58) Field of Classification Search
CPC ........ B41J 2/01; C09D 11/101; C09D 11/322; C09D 11/38; C09D 11/40; C09D 11/50
See application file for complete search history.

(56) References Cited

U.S. PATENT DOCUMENTS

| 9,555,623 | B1 * | 1/2017 | Williams | ............. B41J 2/04586 |
| 2015/0021528 | A1 | 1/2015 | Chartoff | |
| 2015/0023643 | A1 | 1/2015 | Chartoff | |

FOREIGN PATENT DOCUMENTS

| EP | 2412767 A1 | 2/2012 |
| EP | 2474404 A1 | 6/2012 |

(Continued)

OTHER PUBLICATIONS

Richard Chartoff, et al., Functionally Graded Polymer Matrix Nano-Composites by Solid Freeform Fabrciation: A Preliminary Report, Solid Freeform (SFF) symposium, [online], 2003, pp. 385-391, [retrieved on Apr. 23, 2015]. from the Internet: <http://sffsymposium.engr.utexas.edu/Manuscripts/2003/2003-36-Chartoff.pdf>.

*Primary Examiner* — Robert S Walters, Jr.
(74) *Attorney, Agent, or Firm* — Alleman Hall Creasman & Tuttle LLP

(57) ABSTRACT

A method of inkjet printing a gradient dielectric element in a deposition and photo-polymerization process. The method comprises: providing a plurality of complex-dielectric-inks that are inkjet printable including a nanocomposite-ink with an organic-matrix and a nanoparticle filler dispersed within. The plurality of complex-dielectric-inks have a first complex-dielectric-ink having a first photoinitiator and a second complex-dielectric-ink with a second photoinitiator. The first and second complex-dielectric-ink have different wavelength selective photo-polymerization absorption bands such that spectrally discrete exposure results in different degrees of polymerization of the first and second complex-dielectric-ink. The method further comprises providing an optical source to polymerize the complex-dielectric-inks, depositing droplets of the plurality of complex-dielectric-ink and curing the plurality of complex-dielectric-inks, wherein deposition of the plurality of layers result in a volumetric nanoparticle concentration gradient.

26 Claims, 5 Drawing Sheets

(51) Int. Cl.
  *C09D 11/38* (2014.01)
  *C09D 11/40* (2014.01)
  *C09D 11/322* (2014.01)
  *C09D 11/50* (2014.01)

(56) References Cited

FOREIGN PATENT DOCUMENTS

| | | | |
|---|---|---|---|
| EP | 2469309 | B1 | 8/2013 |
| EP | 2392473 | B1 | 9/2013 |

* cited by examiner ized
DUAL PHOTOINITIATED NANOCOMPOSITE-INK PRINTING

GOVERNMENT INTEREST STATEMENT

This invention was made with government support under Contract FA8650-12-C-7226 awarded by the United States Special Operations Command. The government has certain rights in the invention.

TECHNICAL FIELD OF THE DISCLOSURE

The present disclosure relates in general to inkjet printed optics. This application relates in particular to depositing and curing nanocomposite-inks to form freeform gradient refractive index optics (GRIN) and other 3D freeform dielectric structures.

BACKGROUND DISCUSSION

Inkjet printing allows manufacture of dielectric elements, such as an optical-element, with volumetrically varying complex dielectric properties, freeform surface curvatures, and combinations thereof. In a typical printing process, an inkjet printer deposits polymer droplets. A curing mechanism, typically ultraviolet or infrared optical sources, cures the deposited droplets. This process is repeated thereby gradually building the dielectric element. In some processes, a border or mold is provided to contain the printed element. This application relates to another approach.

SUMMARY OF THE DISCLOSURE

The present disclosure is directed inkjet printing a gradient refractive index dielectric element in a deposition and photo-polymerization process. In one aspect the method comprises providing a plurality of complex-dielectric-inks that are inkjet printable including a nanocomposite-ink with an organic-matrix and a nanoparticle filler dispersed within. The plurality of complex-dielectric-inks have a first complex-dielectric-ink having a first photoinitiator and a second complex-dielectric-ink with a second photoinitiator. The first and second complex-dielectric-inks have different wavelength selective photo-polymerization absorption bands such that spectrally discrete exposure results in different degrees of polymerization of the first and second complex-dielectric-ink. The method further comprises providing an optical source to polymerize the complex-dielectric-inks, depositing droplets of the plurality of complex-dielectric-inks and curing the plurality of complex-dielectric-ink, wherein deposition of the plurality of layers result in a volumetric nanoparticle concentration gradient.

In another aspect the depositing droplets of the plurality of complex-dielectric-inks forming a plurality of layers, at least one the plurality of layers having a layer perimeter border defining an infill area within the layer perimeter border, wherein either the layer perimeter border is at least partially cured before the infill area is deposited or the layer perimeter border is at least partially cured before the infill is at least partially cured; and wherein deposition of the plurality of layers result in a volumetric nanoparticle concentration gradient.

BRIEF DESCRIPTION OF THE DRAWINGS

The accompanying drawings, which are incorporated in and constitute a part of the specification, schematically illustrate embodiments of the present disclosure, and together with the general description given above and the detailed description of preferred methods and embodiment given below, serve to explain principles of the present disclosure.

DETAILED DESCRIPTION

Figure 1:
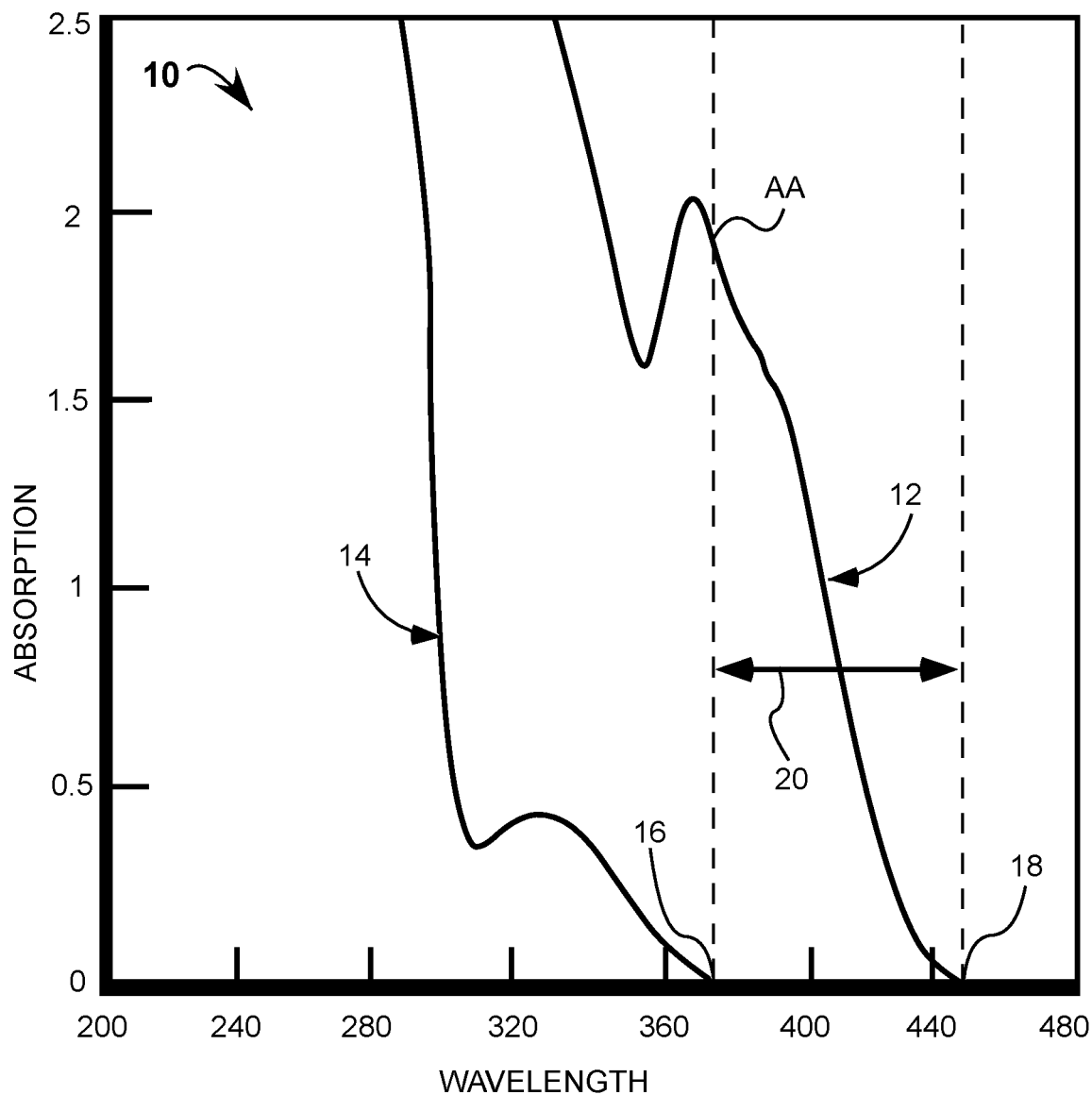
FIG. 1 is a graphical representation of the absorption spectrum of a first photoinitiator and a second photoinitiator dispersed within a first complex-dielectric-ink and a second complex-dielectric-ink, respectively, wherein the first complex-dielectric-ink is curable by a portion of the electromagnetic spectrum that does not cure the second complex-dielectric-ink.

Referring now to the drawings, wherein like components are designated by like reference numerals. Methods of manufacture and various embodiments of the present disclosure are described further herein below.

A method of inkjet printing a gradient dielectric element in a deposition and photo-polymerization process includes providing a plurality of complex-dielectric-inks that are inkjet printable including a nanocomposite-ink with an organic-matrix and a nanoparticle filler dispersed within. The plurality of complex-dielectric-ink have a first complex-dielectric-ink having a first photoinitiator and a second complex-dielectric-ink with a second photoinitiator. The first and second complex-dielectric-ink having different wavelength selective photo-polymerization absorption bands such that spectrally discrete exposure results in different degrees of polymerization of the first and second complex-dielectric-ink. The method further comprises providing an optical source to polymerize the complex-dielectric-inks, depositing droplets of the plurality of complex-dielectric-inks and curing the plurality of complex-dielectric-ink, wherein deposition of the plurality of layers results in a volumetric nanoparticle concentration gradient.

The plurality of complex-dielectric-inks comprise of an organic-matrix with viscosities suitable for inkjet printing. At least one of the plurality of complex-dielectric-inks is nanocomposite-ink with a nanoparticle dispersed within the organic-matrix. The first, second, both, or any other of the complex-dielectric-inks can be nanocomposite-inks. Nonlimiting examples of suitable organic-matrix materials include are cyanoethyl pullulan (CYELP), polyacrylate, hexanediol diacrylate (HDODA), polymethyl methacrylate (PMMA), diethylene glycol diacrylate (DEGDA), cellulose, and organic resins such as from the SU-8 series resists.

Nonlimiting examples of suitable nanoparticle filler material include materials selected from selected from BeO, $Al_2O_3$, SiC, ZnO, $SiO_2$, ZnS, $ZrO_2$, $YVO_4$, $TiO_2$, $CuS_2$, CdSe, PbS, $TeO_2$, MgO, AlN, $LaF_3$, GaSbO, nano-Diamond, $ThF_4$, $HfO_2$:$Y_2O_3$, $Yb_2O_3$, $Dy_2O_3$, $ZrO_2$:$Y_2O_3$, $Si_3N_4$, $Y_2O_3$, KBr, $Ta_2O_5$, $HfO_2$, AlGaP, SiGe, GaAs, Au, Ag, LiF, $MoS_2$, or combinations thereof, including those with core, core/shell, and core/shell/ligand architectures. The nanoparticles can be selected for their material properties including mechanical, electrical, thermal, and optical properties including real, imaginary, and nonlinear properties. In some methods, the plurality of complex-dielectric-inks comprise a plurality of nanocomposite-inks, the plurality of nanocomposite-inks having different finite concentrations of the nanoparticle fillers.

Photoinitiators are molecules that polymerize the organic-matrix when exposed to electromagnetic radiation. Absorption of electromagnetic radiation releases reactive species that cross-link monomers, oligomer, and nanoparticles fillers. Typically, photoinitiators are UV activated. Nonlimiting examples of suitable photoinitiators include acetophenone, anisoin, anthraquinone, anthrqunone-2sulfonic acid-sodium salt monohydrate, tricarbonylchromium, benzyl, benzoin, benzoin ethyl ether, benzoin isobutyl ether, benzophenone, benzophenone/1-hydoxycyclohexyl phenyl ketone, 3,3',4,4'-benzophenonetetracarboxylic, 4-benzoylbiphenyl, 2-benzyl-2-(dimethlamino)-4'-morpholinobutyrophenone, 4,4'-bis(diethylamino)benzophenone, camphorquinone, 2-chlorothiozanthen-9-one, (cumene)cyclopentadienyliron (II)hexafluorophosphate, dibenzosuberenone, 2,2-diethoxyacetophenone, 4,4'-dihydroxybenzophenone, 2,2-dimethoxy-2-phenylacetophenone, 4-(dimetholamino) benzophenone, 4,4'-dimethylbenzil, 2,5-dimenthylbenzophenone, 3,4-dimethylbenzophenone, diphenyl(2,4,6-trimehtylbenzoyl)phosephine oxide/2-hydroxy-2-methylpropiophenone, 4'-ethoxyacetophenone, 2-ethylanthraquinone, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylproppiophenone, 2-methylbenzophenone, 3-methylbenzophenone, methybenzoylformate, 2-methl-4'-(methylthio)-2-morpholinopropio-phenone, phenanthrenequinone, 4'-phenozyacetophenone, thiozanthen-9-one, triarylsulfonium hexafluoroantimonate salts, triarylsulfonium hexafluorophosphate salt.

The photoinitiator determines the degree of polymerization under a given photo-dosage. Within any of the plurality of complex-dielectric-inks, the photoinitiator can vary by the material type and concentration. A plurality of photoinitiators can be used. The photoinitiator characteristics determine, in part, the depth dependent spectral absorbance and degree of polymerization for a given dosage of electromagnetic radiation by the optical source.

In addition to depositing the plurality of complex-dielectric-inks, the disclosed methods can also further comprise depositing a radical reaction inhibitor. The radical reaction inhibitor restricts the spread of polymerization during photocuring of the plurality of complex-dielectric-inks. For instance, when spatially localized curing is desired, the radical reaction inhibitor can be deposited to control the extent of the curing process. The radical reaction inhibitor can be deposited alone, or incorporated within one of the plurality of complex-dielectric-inks.

The complex-dielectric-inks can be formulated by organic-matrix, photoinitiator type and concentration, the nanoparticle material type, and nanoparticle size distribution. As aforementioned the complex-dielectric-inks that contain nanoparticles are generally referred to as nanocomposite-inks. Material properties of the dielectric device can be changed based on the nanoparticle loading and concentration gradient. The disclosed methods are particular well suited for manufacturing an optical-element to manipulate UV, visible, NIR, IR, microwave, millimeter, radio frequencies and combinations thereof. For instance, the refractive, reflective, and absorptive properties are influenced by the formulation. In on instance, the refractive-index of the nanocomposite-inks is influenced by the formulation. An approximation can be calculated based on the summation by percent volume of the optical properties of the organic-matrix and the nanoparticles, although direct measurement is a preferred method of determining the refractive index for any given nanocomposite-ink formation. For a nanocomposite-ink with one nanoparticle type, the refractive index is given by the following equation:

$$n_{eff}(\lambda) = V\%_{NP} \times n_{NP}(\lambda) + V\%_{OM} \times n_{OM}(\lambda),$$

where $n_{eff}(\lambda)$ is the effective index of the nanocomposite-ink, $V\%_{NP}$ is the percent volume of the nanoparticles $n_{NP}(\lambda)$ is the refractive-index of the nanoparticles, $V\%_{OM}$ is the percent volume of the organic-matrix, and $n_{OM}(\lambda)$ is the refractive-index of the organic-matrix. Additionally, nanoparticles can be added and percent volume and refractive-index included in the equation.

In general, the nanocomposite-inks loaded with the nanoparticles will have a volume proportional increase of refractive-index. For instance, a nanocomposite-ink with nanoparticles that have a high-index relative to the organic-matrix will have increased refractive-index with increased nanoparticle concentration. Likewise, a nanocomposite-ink with a low-index nanoparticle, for instance a hollow buckeyball, comprised mostly of air, with an optical refractive index (n) of n=1, results in a nanocomposite-ink with a refractive index lower than the organic-matrix.

The optical source can be any optical source emitting electromagnetic radiation within the absorbance spectrum of the photoinitiators. Preferably, the electromagnetic source is either spectrally tunable or otherwise a plurality of optical sources are used. The optical sources can be broadband emission sources or spectrally discrete. Suitable optical sources include filament based sources, flash lamps, light emitting diodes (LED), laser diodes (LD), lasers, or combinations thereof.

Referring to FIG. 1, an absorption spectrum 10 of a first complex-dielectric-ink with a first photoinitiator and a second complex-dielectric-ink with a second photoinitiator wherein the first complex-dielectric-ink is curable by exposure to a portion of the electromagnetic spectrum that does not cure the second nanocomposite-ink. Here, the first photoinitiator is Irgacure 819 and the second photoinitiator is Irgacure 184, or iphenyl(2,4,6-trimehtylbenzoyl)phosephine oxide/2-hydroxy-2-methylpropiophenone and 1-hydroxycyclohexyl phenyl ketone, respectfully. Both photoinitiators can be obtained commercially from BASF of Ludwigshafen, Germany. The first complex-dielectric-ink is characterized by an absorption curve 12 and the second complex-dielectric-ink is characterized by an absorption curve 14. Absorption curve 14 has high absorption in the deep ultraviolet (DUV) becoming appreciably transparent at a transparent point 16 wherein the extinction coefficient is at about zero at about 370 nm. Absorption curve 12 has high absorption in the DUV with appreciable absorption in the blue region of the visible spectrum until a transparent point 18 at about 450 nm. Between transparent point 16 and transparent point 18 the first complex-dielectric-ink has spectrally discrete photocurable region with a spectral bandwidth 20 that is about 80 nm wide from about 370 nm to about 460 nm.

Here, the first and second complex-dielectric-inks allow for discrete curing. Using a wavelength tunable optical source or a plurality of spectrally discrete optical sources, the first complex-dielectric-ink can be cured without curing the second complex-dielectric-ink. A broadband emission source with a bandpass or long pass dielectric filter can be used to cure the first complex-dielectric-ink or both the first and second complex-dielectric-ink. In addition, the wavelength tunable optical source allows curing of the first and second complex-dielectric-ink at various positions along the respective absorption curves, allowing control over the cure depth and degree of curing. Otherwise a plurality of spectrally discrete optical sources, such as LEDs or laser based optical sources can be used.

Figure 2:
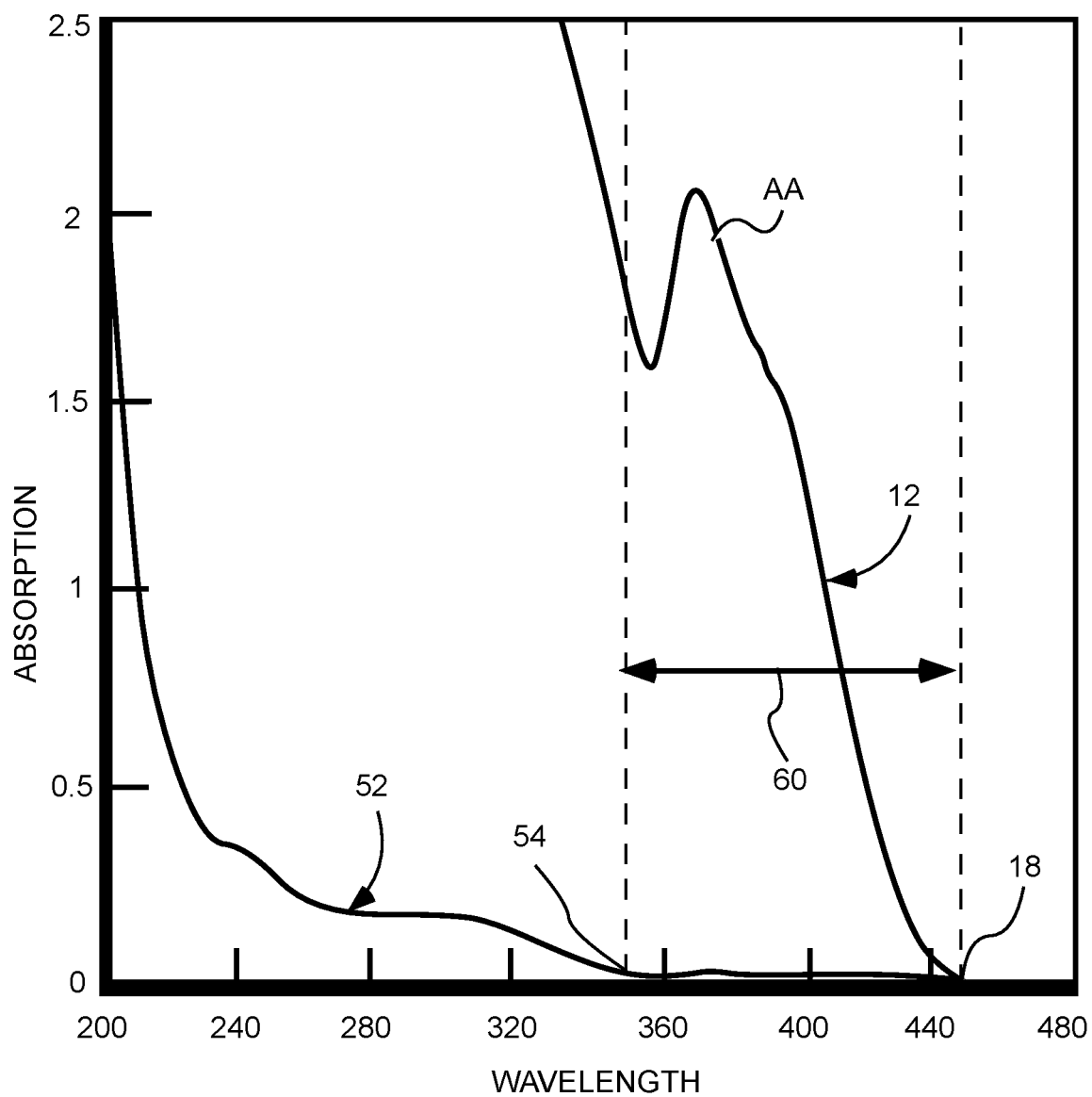
FIG. 2 is a graphical representation of the absorption spectrum of a first photoinitiator and a second photoinitiator dispersed within a first complex-dielectric-ink and a second complex-dielectric-ink, respectively, wherein the first and second photoinitiator are the same with different levels of concentration within the respective complex-dielectric-inks, such that the first complex-dielectric-ink is curable by a portion of the electromagnetic spectrum that does not substantially cure the second complex-dielectric-ink.

Referring to FIG. 2, an absorption spectrum 50 of a first complex-dielectric-ink with a first photoinitiator and a second complex-dielectric-ink with a second photoinitiator wherein the first and second photoinitiator are the same material type with different levels of concentration within the respective complex-dielectric-inks, such that the first complex-dielectric-ink is curable by a portion of the electromagnetic spectrum that does not substantially cure the second nanocomposite-ink.

The first complex-dielectric-ink is the same as that shown in FIG. 1 with an absorption curve 12 with high absorption in the DUV, becoming transparent at transparent point 16. Here, the second complex-dielectric-ink has a second photoinitiator that is the same type as the first photoinitiator with a smaller concentration such that the first complex-dielectric-ink can be cured without substantially curing the second complex-dielectric-ink. The second complex-dielectric-ink is characterized by an absorption curve 52. Absorption curve 52 has high absorbance in the DUV from about 200 nm to about 240 nm wherein the extinction coefficient of about 0.35. The extinction ratio is substantially small at a point 54 at about 350 with an extinction coefficient less than 0.1 that transition to transparent point 18 at 450 nm. A bandwidth 60 has a bandwidth of about 100 nm wherein curing of the first complex-dielectric-ink can occur without substantially curing the second complex-dielectric-ink.

One preferred method of deposition of the plurality of complex-dielectric-inks is inkjet printing. The plurality of complex-dielectric-inks can be deposited in a composition compatible with spray nozzle or inkjet deposition systems, including those with thermal, piezo, or continuous flow printheads. The printer can have one or more printheads, each printhead containing, one, tens, or thousands of nozzles that can eject droplets ranging from sub-picoliter, tens-picoliter, or larger droplet volume.

Depending on the deposition process, the plurality of complex-dielectric-inks have viscosities of about 10 cP or less, producing droplets from about 0.1 pl to about 100 pl. Interrupted continuous flow heads break up a continuous ejection out a nozzle with resonant application of a force perpendicular to the flow resulting in a repeatable, predictable stream of droplets, which can range from about 1 pl to 100 pl making use of fluids with viscosities of 200 cP or less. Droplets that are not required are deflected, using air impingement or electrostatic charge selectively applied, into a recycling channel alongside the trajectory of the droplets to be used. The nozzles should be preferably located in proximity to the substrate on which the nanocomposite-ink is being printed, dependent on the deposition accuracy required. For precise deposition, the printhead should be within a centimeter or less of the substrate. Varying concentrations of nanoparticles throughout the printed layers, droplet-by-droplet, or layer-by-layer, throughout the volume of the printed dielectric element, three dimensional dielectric property patterns are created. Using a plurality of photoinitiators that are spectrally independent allows complex spatial control over the printing process without regard to the optical source illumination spot size.

During manufacture of the dielectric element, the deposited complex-dielectric-inks are positioned with respect to the optical source from selective-curing. Selective-curing refers to applying radiation that polymerizes the organic-matrix. Selective-curing can be performed locally with a spatially discrete optical source, or globally with a flood cure over the entire element. Selective-curing can partially or fully cure the complex-dielectric-inks. To avoid interfaces subsequent layers are partially cured, or gelled, to allow intermixing of subsequent layers. During cure, the deposited complex-dielectric-inks can be manipulated by application of an external effect such as application of an electric or magnetic field, change in ambient temperature, or change in local pressure.

Using the aforementioned nonlimiting examples of depositing and curing the complex-dielectric-inks allows increased control of manufacturing spatially discrete location structures and providing more uniform curing. The methods can be used to manufacture dielectric elements and is particularly well suited for manufacturing optical-elements. Another preferred method of inkjet printing a gradient refractive index optical-element in a deposition and polymerization process comprises: providing a plurality of complex-dielectric-inks that are photo inkjet printable including a nanocomposite-ink with an organic-matrix and nanoparticle dispersed within; depositing droplets of the plurality of complex-dielectric-inks to form a plurality of layers having a layer perimeter border defining an infill area within the layer perimeter border, wherein either the layer perimeter border is at least partially cured before the infill area is deposited or the perimeter border is at least partially cured before the infill is at least partially cured; and wherein deposition of the plurality of layers result in a volumetric nanoparticle concentration gradient.

Figures 3A, 3B:
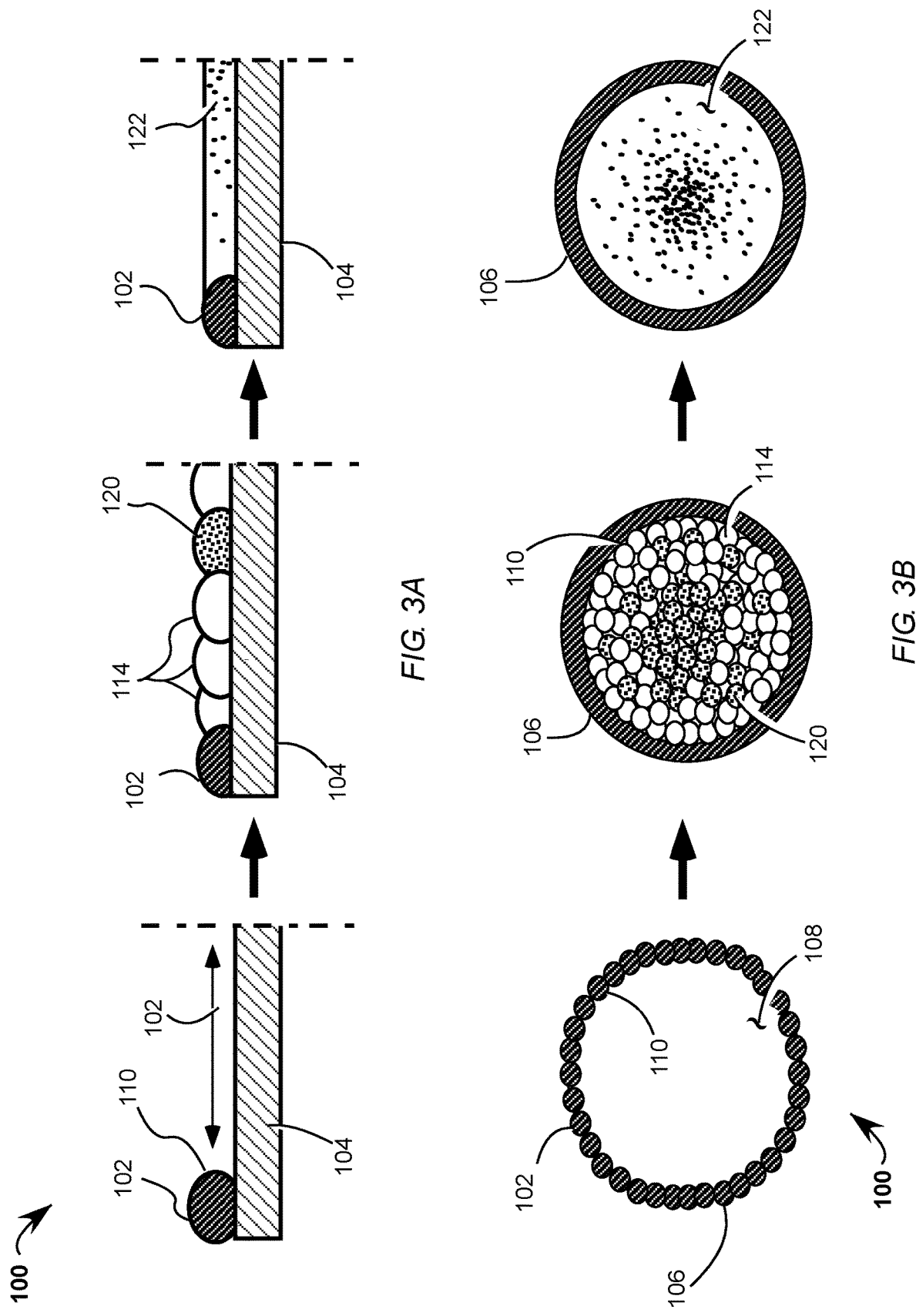
FIG. 3A is a partial cross-section view of an optical-element in process illustrating a method of manufacturing including providing a plurality of complex-dielectric-ink that are inkjet printable including a nanocomposite-ink with an organic-matrix and a nanoparticle filler dispersed within; the plurality of complex-dielectric-ink including a first complex-dielectric-ink having a first photoinitiator and a second complex-dielectric-ink with a second photoinitiator; the first and second complex-dielectric-inks having different wavelength selective photo-polymerization absorption bands such that spectrally discrete exposure results in different degrees of polymerization of the first and second complex-dielectric-ink; providing an optical source to polymerize the complex-dielectric-ink, depositing droplets of the plurality of complex-dielectric-ink and curing the plurality of complex-dielectric-inks, wherein deposition of the plurality of layers results in a volumetric nanoparticle concentration gradient
FIG. 3B is a plan view illustrating an optical-element in process shown in FIG. 3A

Referring to FIG. 3A and FIG. 3B, a layer perimeter border deposition process 100 is illustrated. FIG. 3A is a partial cross-section view of process 100 with FIG. 3B providing a corresponding plan view. A first complex-dielectric-ink droplet 102 is deposited on a substrate 104 in a radial pattern. First complex-dielectric-ink 102 has a first photoinitiator dispersed within. The radial pattern of droplets coalesces to form a layer perimeter border 106 with an infill area 108 within an inner sidewall 110 of the layer perimeter border. Layer perimeter border 106 is at least partially cured. Layer perimeter border 106 is cured by either a first optical source.

Infill area 108 is filled through deposition of a second complex-dielectric-ink 114 and a third complex-dielectric-ink 120. Second complex-dielectric-ink 114 has no nanoparticle filler, third complex-dielectric-ink 120 has a nanoparticle filler dispersed within, and both the second and third complex-dielectric-ink have a second photoinitiator dispersed within. The second and third complex-dielectric-inks are cooperatively deposited within infill area 108 in a gradient refractive index 122 bound by layer perimeter border 106.

After an appropriate diffusion time, the second and third nanocomposite-ink are at least partially cured with a second optical-source. The process is repeated with another layer perimeter border deposited about on top of layer perimeter border 106. The next layer perimeter border is cured with the first optical source, the first optical source activating the first photoinitiator and not activating the second photoinitiator.

The layer perimeter border is advantageously at the same height as the second and third complex-dielectric-ink thereby avoiding surface deformation through contact angle effects which induce meniscus bowing. In addition, the aforementioned techniques allow the printhead to remain in close proximity to the optical-element in process thereby reducing droplet deposition travel and associated angular spatial deposition error.

Figure 4:
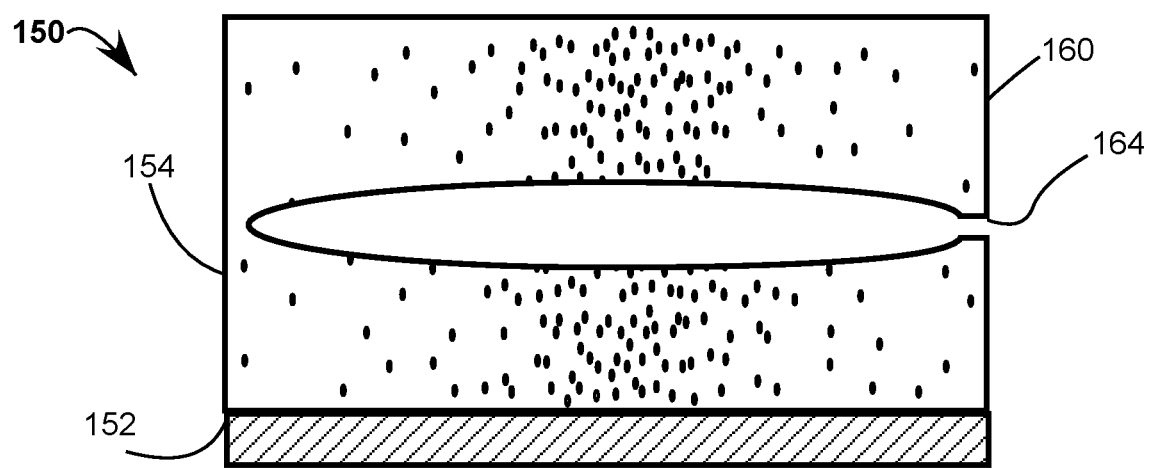
FIG. 4 is a cross-section view of an optical-element with an integrated air-spacing.

In addition to printing a layer perimeter border, the disclosed technique also allows manufacture of optical and mechanical structures. Referring to FIG. 4 an optical-element 150 has an integrated air spacing. Optical-element 150 has a substrate 152 and a nanocomposite body 154 with an air spacing 160. Air space 160 was created by depositing a complex-dielectric-ink that was later evacuated through an opening 164.

Figure 5A:
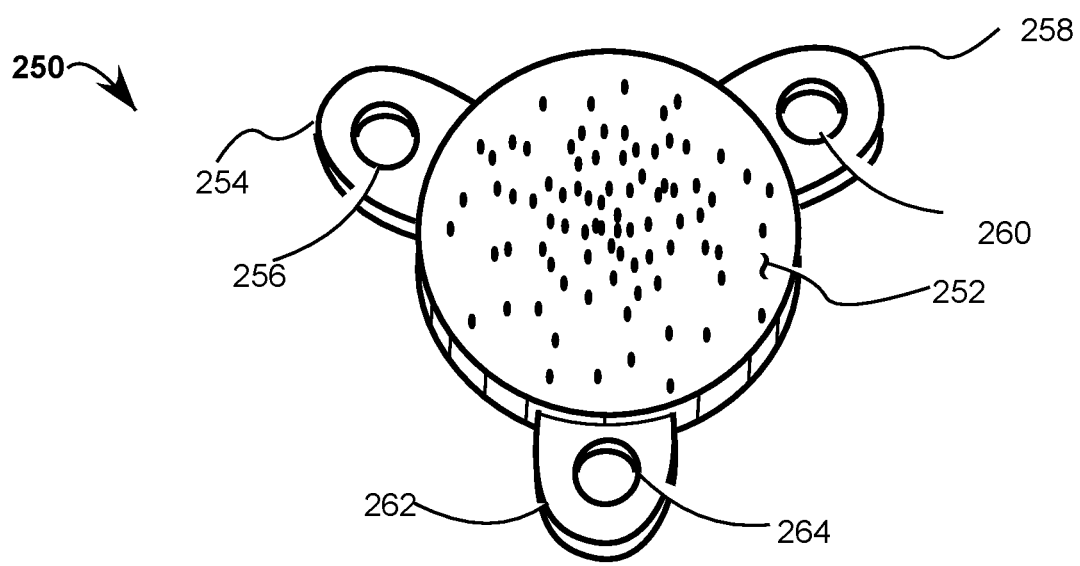
FIG. 5A is a perspective view of an optical-element with integrated mounting features.
Figure 5B:
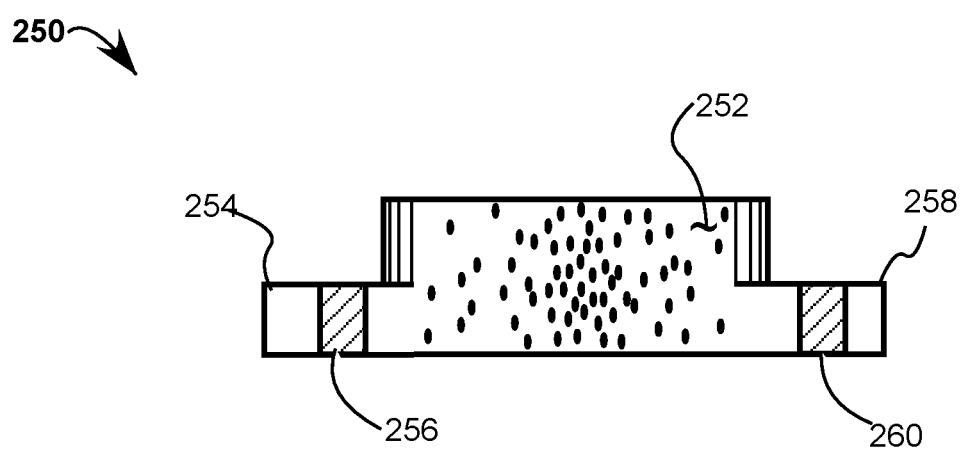
FIG. 5B is a cross-section view of the optical-element shown in FIG. 5A

Referring to FIGS. 5A and 5B, an optical-element 250 has mechanical mounting features. Optical-element 250 is a gradient refractive index optic with tabbed mounting features. Optical-element 250 has a mounting tab 254, a mounting tab 258, and a mounting tab 262, the mounting tabs having a thru-hole 256, a thru-hole 260, and a mounting thru-hole 264, respectively. The optical-element comprises of a plurality of cured complex-dielectric-inks according to the aforementioned methods of manufacture. Here the mounting tabs were manufactured in a layer by-layer process simultaneously with the active optical area. Similar to that described above when printing the perimeter layer border, the mounting tabs have well defined edges and aspect ratios due to the ability to cure them without curing other areas.

In addition to the layer perimeter border, steep sidewalls, and mounting tabs, other physical features can be incorporated during manufacture without curing or over-curing the optically active region. Such features include alignment features, baffles, apertures, and mounting flanges.

Another advantage of the disclosed method is simultaneous printing of both mechanical features and optical features. Unlike other processes where printing of certain features must occur first, the disclosed techniques advantageously allows the printhead to remain in close proximity to the optical-element throughout the printing process thereby reducing droplet deposition travel and associated angular spatial deposition error. The following implementations are disclosed: 1. A method of inkjet printing a gradient dielectric element in a deposition and photo-polymerization process, the method comprising: providing a plurality of complex-dielectric-inks that are inkjet printable including a nanocomposite-ink with an organic-matrix and a nanoparticle filler dispersed within, the plurality of complex-dielectric-inks comprises a first complex-dielectric-ink having a first photoinitiator and a second complex-dielectric-ink with a second photoinitiator, the first and second complex-dielectric-inks having different wavelength selective photo-polymerization absorption bands such that spectrally discrete exposure results in different degrees of polymerization of the first and second complex-dielectric-inks; providing an optical source to polymerize the plurality of complex dielectric-inks; depositing droplets of the plurality of complex-dielectric-inks and curing the plurality of complex-dielectric-inks, wherein deposition of the plurality of layers result in a volumetric nanoparticle concentration gradient. 2. The method of implementation 1, wherein the first complex-dielectric-inks is curable by a portion of the electromagnetic spectrum that does not cure the second complex-dielectric-inks. 3. The method of implementation 2, wherein the optical source comprises of a first optical source and a second optical source, the first optical source emission curing only the first complex-dielectric-ink and the second optical source curing at least the second complex-dielectric-ink. 4. The method of implementation 2, wherein the optical source is a broadband emission source with a bandpass or longpass filter with wavelength adjustable emission based on angle of the filter. 5. The method of implementation 1, wherein curing the plurality of complex-dielectric-inks includes delivering doses of optical radiation that cures the first complex-dielectric-ink without appreciably curing the second complex-dielectric-ink. 6. The method of implementation 5, wherein the first and second complex-dielectric-ink have different concentrations of the same photoinitiator type. 7. The method of implementation 1, wherein the nanoparticle filler has nanoparticles selected from BeO, $Al_2O_3$, SiC, ZnO, $SiO_2$, ZnS, $ZrO_2$, $YVO_4$, $TiO_2$, $CuS_2$, CdSe, PbS, $TeO_2$, MgO, AlN, $LaF_3$, GaSbO, nano-Diamond, $ThF_4$, $HfO_2$—$Y_2O_3$, $Yb_2O_3$, $Dy_2O_3$, $ZrO_2$—$Y_2O_3$, $Si_3N_4$, $Y_2O_3$, KBr, $Ta_2O_5$, $HfO_2$, AlGaP, SiGe, GaAs, Au, Ag, LiF, $MoS_2$, or combinations thereof. 8. The method of implementation 1, wherein the first complex-dielectric-ink is optically opaque. 9. The method of implementation 1, wherein a portion of the plurality of complex-dielectric-inks is uncured. 10. The method of implementation 9, further comprising the steps of removing the uncured complex-dielectric-inks. 11. The method of implementation 1, wherein the volumetric nanoparticle concentration gradient is designed for manipulation of UV, visible, NIR, IR, microwave, millimeter, radio frequency waves, or combinations thereof. 12. The method of implementation 1, wherein the volumetric nanoparticle concentration gradient results in a volumetric gradient refractive index. 13. The method of implementation 1, wherein the volumetric nanoparticle concentration gradient results in a refractive nonlinear gradient. 14. A method of inkjet printing a gradient dielectric element in a deposition and polymerization process, the method comprising: providing a plurality of complex-dielectric-inks that are photo inkjet printable including a nanocomposite-ink with an organic-matrix and a nanoparticle filler dispersed within; depositing droplets of the plurality of complex-dielectric-inks to form a plurality of layers, at least one the plurality of layers having a layer perimeter border defining an infill area within the layer perimeter border, wherein either the layer perimeter border is at least partially cured before the infill area is deposited or the layer perimeter border is at least partially cured before the infill is at least partially cured; and wherein deposition of the plurality of layers result in a volumetric nanoparticle concentration gradient. 15. The method of implementation 14, wherein the nanoparticle filter has nanoparticles selected from BeO, $AlO_3$, SiC, ZnO, $SiO_2$, ZnS, $ZrO_2$, $YVO_4$, $TiO_2$, $CuS_2$, CdSe, PbS, $TeO_2$, MgO, AlN, $LaF_3$, GaSbO, nano-Diamond, $ThF_4$, $HfO_2$—$Y_2O_3$, $Yb_2O_3$, $Dy_2O_3$, $ZrO_2$—$Y_2O_3$, $Si_3N_4$, $Y_2O_3$, KBr, $Ta_2O_5$, $HfO_2$, AlGaP, SiGe, GaAs, Au, Ag, LiF, $MoS_2$, or combinations thereof. 16. The method of implementation 14, wherein the perimeter border is at least partially cured by a spatially discrete optical source. 17. The method of implementation 16, wherein the spatially discrete optical source is a focused LED or laser diode. 18. The method of implementation 14, further comprising depositing a radical reaction inhibitor within the inner sidewall of the perimeter border before deposition of 17 the infill area, the radial reaction inhibitor decreasing spread of the polymerization process to the infill area during curing of the perimeter border. 19. The method of implementation 18, wherein the infill area of at least one of the plurality of layers is not cured. 20. The method of implementation 14, wherein the plurality of complex-dielectric-inks comprises a first complex-dielectric-ink having a first photoinitiator and a second complex-dielectric-ink with a second photoinitiator, the first complex-dielectric-ink curable by a first optical source that does not cure the second complex-dielectric-ink, the second complex-dielectric-ink curable by a second optical source. 21. The method of implementation 20, wherein the second complex-dielectric-ink is a nanocomposite-ink. 22. The method of implementation 20, wherein the uncured infill area is removed. 23. The method of implementation 20, wherein the first complex-dielectric-ink is deposited as the perimeter border, the perimeter border cured first thereby confining the second complex-dielectric-ink. 24. The method of implementation 20, wherein the first complex-dielectric-ink has a higher viscosity than the second complex-dielectric-ink. 25. The method of implementation 20, wherein the first complex-dielectric-ink is cured while the second complex-dielectric-ink is being deposited. 26. The method of implementation 14, wherein the first optical source and the second optical source are selected from filament-based sources, flash lamps, light emitting diodes, laser diodes, lasers, or combinations thereof. 27. The method of implementation 14, wherein the second complex-dielectric-ink is allowed to at least partially intermix before curing.

From the description of the present invention provided herein one skilled in the art can practice the methods in accordance with the present disclosure. Those skilled in the art to which the present invention pertains will recognize that while above-described embodiments of the inventive optical-element and method of manufacture are exemplified using particular materials others may be combined using these embodiments without departing from the spirit and scope of the present invention. Some of the embodiments explained above have certain symmetry one skilled in the art will recognize that radial symmetry is not a requirement and cylindrical and anamorphic optical-elements manufactured with the disclosed techniques.

In summary, the present invention is described above in terms of particular embodiments. The invention, however, is not limited to the embodiments described and depicted herein. Rather, the invention is limited only by the claims appended hereto.

What is claimed is:

1. A method of forming a gradient-dielectric element in a deposition and photo-polymerization process, the method comprising:

providing a plurality of inkjet-printable inks, each including an organic matrix, wherein at least one of the inkjet-printable inks includes a nanoparticle filler dispersed within the organic matrix, the plurality of inkjet-printable inks comprising a first ink having a first photoinitiator and a second ink having a second photoinitiator, the first and second inks having different photo-polymerization absorption bands, such that spectrally discrete exposure results in different degrees of polymerization of the first and second inks;

providing an optical source configured to polymerize the plurality of inkjet-printable inks;

depositing a plurality of droplets of each of the plurality of inkjet-printable inks in a plurality of layers; and curing at least a portion of the plurality of inkjet-printable inks, wherein deposition and subsequent curing results in a volumetric concentration gradient of the nanoparticle filler within at least one of the plurality of layers.

2. The method of claim 1, wherein the first ink is curable by a portion of the electromagnetic spectrum that does not cure the second ink, and wherein the optical source comprises a first optical source of emission configured to cure only the first ink and a second optical source of emission configured to cure at least the second ink.

3. The method of claim 1, wherein the optical source is a broadband emission source with a bandpass or longpass filter with wavelength-adjustable emission based on an angle of the filter.

4. The method of claim 1, wherein curing at least the portion of the plurality of inkjet-printable inks includes delivering doses of optical radiation that cure the first ink without appreciably curing the second ink.

5. The method of claim 4, wherein the first and second inks have different concentrations of a same photoinitiator.

6. The method of claim 1, wherein the nanoparticle filler includes nanoparticles selected from BeO, $Al_2O_3$, SiC, ZnO, $SiO_2$, ZnS, $ZrO_2$, $YVO_4$, $TiO_2$, $CuS_2$, CdSe, PbS, $TeO_2$, MgO, AlN, $LaF_3$, GaSbO, nano-Diamond, $ThF_4$, $HfO_2$:$Y_2O_3$, $Yb_2O_3$, $Dy_2O_3$, $ZrO_2$:$Y_2O_3$, $Si_3N_4$, $Y_2O_3$, KBr, $Ta_2O_5$, $HfO_2$, AlGaP, SiGe, GaAs, Au, Ag, LiF, $MoS_2$, or combinations thereof.

7. The method of claim 1, wherein the first ink is optically opaque.

8. The method of claim 1, wherein the portion of the plurality of inkjet-printable inks is a first portion, and wherein curing at least the portion of the plurality of inkjet-printable inks includes delivering doses of optical radiation that leave uncured a second portion of the plurality of inkjet-printable inks.

9. The method of claim 8, further comprising removing the uncured second portion of the plurality of inkjet-printable inks.

10. The method of claim 1, wherein the gradient-dielectric element is an element for manipulating UV, visible, NIR, IR, microwave, millimeter, or radio-frequency waves, or combinations thereof.

11. The method of claim 1, wherein the volumetric concentration gradient corresponds to a volumetric gradient of refractive index in the gradient-dielectric element.

12. The method of claim 11, wherein the gradient of the refractive index is nonlinear.

13. The method of claim 1, wherein the volumetric concentration gradient is a first volumetric concentration gradient, and wherein deposition in the plurality of layers and subsequent curing results in a second volumetric concentration gradient of the nanoparticle filler across the plurality of layers.

14. A method of forming a gradient dielectric element in a deposition and polymerization process, the method comprising:
- providing a plurality of inkjet-printable inks, each including a photo-polymerizable organic matrix, wherein at least one of the inkjet-printable inks includes a nanoparticle filler dispersed within the photo-polymerizable organic matrix;
- depositing a plurality of droplets of each of the plurality of inkjet-printable inks in a plurality of layers, at least one of the plurality of layers having a layer-perimeter border defining an infill area within the layer-perimeter border, wherein ink deposited at the layer-perimeter border is at least partially cured before additional ink is deposited in the infill area or wherein the ink deposited at the layer-perimeter border is at least partially cured before the additional ink deposited in the infill area is at least partially cured; and
- curing at least a portion of the plurality of inkjet-printable inks, wherein deposition and subsequent curing results in a volumetric concentration gradient of the nanoparticle filler within the at least one of the plurality of layers.

15. The method of claim 14, wherein the nanoparticle filter includes nanoparticles selected from BeO, $Al_2O_3$, SiC, ZnO, $SiO_2$, ZnS, $ZrO_2$, $YVO_4$, $TiO_2$, $CuS_2$, CdSe, PbS, $TeO_2$, MgO, AlN, $LaF_3$, GaSbO, nano-Diamond, $ThF_4$, $HfO_2{:}Y_2O_3$, $Yb_2O_3$, $Dy_2O_3$, $ZrO_2{:}Y_2O_3$, $Si_3N_4$, $Y_2O_3$, KBr, $Ta_2O_5$, $HfO_2$, AlGaP, SiGe, GaAs, Au, Ag, LiF, $MoS_2$, or combinations thereof.

16. The method of claim 14, wherein the ink deposited at the layer-perimeter border is at least partially cured by a spatially discrete optical source.

17. The method of claim 16, wherein the spatially discrete optical source comprises a focused LED or laser diode.

18. The method of claim 14, further comprising depositing a radical-reaction inhibitor within an inner sidewall of the layer-perimeter border before deposition of the additional ink in the infill area, the radical-reaction inhibitor decreasing a spread of the polymerization process to the infill area during the curing.

19. The method of claim 18, wherein for the at least one of the plurality of layers, the ink deposited at the layer-perimeter border is at least partially cured before the additional ink is deposited in the infill area.

20. The method of claim 18, wherein for the at least one of the plurality of layers, the ink deposited at the layer-perimeter border is at least partially cured before the additional ink deposited in the infill area is at least partially cured.

21. The method of claim 14, wherein the plurality of inkjet-printable inks comprises a first ink having a first photoinitiator and a second ink having a second photoinitiator, the first ink being curable by a first optical source that does not cure the second ink, and the second ink being curable by a second optical source.

22. The method of claim 21, further comprising removing the additional ink deposited in the infill area.

23. The method of claim 21, wherein the first ink is deposited at the layer-perimeter border, and wherein the first ink is cured before the second ink is cured, thereby confining the second ink prior to curing the second ink.

24. The method of claim 21, wherein the first ink has a higher viscosity than the second ink.

25. The method of claim 21, wherein the first ink is cured while the second ink is being deposited.

26. The method of claim 14, wherein the volumetric concentration gradient is a first volumetric concentration gradient, and wherein deposition in the plurality of layers and subsequent curing results in a second volumetric concentration gradient of the nanoparticle filler across the plurality of layers.

* * * * *